(12) United States Patent
White et al.

(10) Patent No.: US 6,424,441 B1
(45) Date of Patent: *Jul. 23, 2002

(54) METHOD AND APPARATUS FOR SENSING AN AUDIO SIGNAL THAT IS SENSITIVE TO THE AUDIO SIGNAL AND INSENSITIVE TO BACKGROUND NOISE

(75) Inventors: Stanley A. White, San Clemente; Kenneth S. Walley, Portola Hills; James W. Johnston, Rancho Santa Margarita; P. Michael Henderson, Tustin; Kelly H. Hale, Aliso Viejo, all of CA (US); Warner B. Andrews, Jr., Boulder, CO (US); Jonathan I. Siann, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/491,726

(22) Filed: Jan. 27, 2000

(Under 37 CFR 1.47)

Related U.S. Application Data

(63) Continuation of application No. 08/920,846, filed on Aug. 29, 1997, now Pat. No. 6,072,882.

(51) Int. Cl.[7] .............................................. H04B 10/02
(52) U.S. Cl. ...................................... 359/150; 381/94.1
(58) Field of Search ............................... 381/94.1, 94.7, 381/172; 359/149–151

(56) References Cited

U.S. PATENT DOCUMENTS

| 4,412,105 A | 10/1983 | Muscatell |
| 4,479,265 A | 10/1984 | Muscatell |
| 4,594,695 A | 6/1986 | Garcannat et al. |

*Primary Examiner*—Minsun Oh Harvey
(74) *Attorney, Agent, or Firm*—Scott A. Horstmeyer; Thomas, Kayden Horstemeyer & Risley, LLP

(57) ABSTRACT

A method and apparatus for sensing audio frequency-pressure modulation of the moisture content of the atmosphere caused by a moisture-laden audio source, such as a live human voice, is disclosed. A first light emitter is provided to generate a first light beam. An audio source that emits moisture, and the environment, modulate the first light beam to generate a first modulated light beam. A first detector is provided to detect and demodulate the first modulated light beam to recover an uncompensated audio signal. A second light emitter is provided to generate a second light beam. The second light beam is modulated by the environment and not by the audio source to produce a second modulated light beam. A second detector is provided to detect and demodulate the second modulated light beam to recover the signal component caused by environmental conditions. A differential amplifier is provided to generate a compensated output signal representing the difference between the uncompensated audio signal and the signal component caused by environmental conditions. The output signal can be transmitted for amplification, distribution, and/or recording.

13 Claims, 5 Drawing Sheets

METHOD AND APPARATUS FOR SENSING AN AUDIO SIGNAL THAT IS SENSITIVE TO THE AUDIO SIGNAL AND INSENSITIVE TO BACKGROUND NOISE

CROSS REFERENCE TO RELATED APPLICATIONS

This application is a continuation of application Ser. No. 08/920,846, filed on Aug. 29, 1997, now U.S. Pat. No. 6,072,882 for METHOD AND APPARATUS FOR SENSING AN AUDIO SIGNAL THAT IS SENSITIVE TO THE AUDIO SIGNAL AND INSENSITIVE TO BACKGROUND NOISE.

BACKGROUND OF THE INVENTION

1. Field of the Invention

This invention relates generally to the field of microphones, and particularly to a method and apparatus for sensing audio signals that are sensitive to the audio signal but are insensitive to background noise.

2. Background Art

Prior art microphones generally operate under the principle of transducer action. Acoustic waves generated by one's vocal chords impinge on a transducer element, such as a diaphragm, piezo-electric crystal, or capacitor plate. The displacement of the transducer element caused by the acoustic waves is transformed into a corresponding electrical signal which is amplified for presentation or recording. For example, piezo-electrical crystal microphones, variable-resistor class microphones, dynamic microphones, and condenser (also known as capacitor or electret) microphones all operate under the transducer theory that relies on pressure waves in the air or contact vibration sensing to convert speech into electrical signals.

One major drawback of prior art microphones is that they are sensitive to background noise. Accordingly, these prior art microphones are often less sensitive to the intended audio source. Furthermore, these prior art microphones are not easily adapted for use in many different situations because of their fixed placement. For example, many prior art microphones are mechanically mounted in a fixed location so they will not be able to receive the acoustic waves from a moving audio source in a consistent manner. As a further example, other prior art microphones are portable in that they may be worn by the talker, but these microphones suffer from the inconveniences associated with entangled and cluttered wires. Further, wireless microphones are subject to RF interference.

These prior art microphones typically exhibit tolerable performance in high signal and low noise environments. However, when the noise in an environment increases, the performance of these microphones degrades appreciably. In fact, in high noise environments, the signal to be recorded is often muffled or imperceptible because of the surrounding background noise. The signal to noise ratio (S/N) can degrade to a point that no meaningful audio information is recovered after demodulation.

Furthermore, as one increases the sensitivity of these prior art microphones to improve signal quality, these microphones also become more sensitive to the background noise. In other words, prior art microphones do not have the ability to differentiate between the audio signal and background noise.

Accordingly, there remains a need for a method and apparatus for sensing an audio signal that is sensitive to the audio signal but insensitive to background noise, and which provides improved signal quality.

SUMMARY OF THE INVENTION

According to one aspect of the invention, the present invention provides a method and apparatus for sensing audio frequency pressure modulation of the moisture content of the atmosphere caused by a moisture-laden audio source, such as a live human voice. As a result, the present invention is sensitive to the humid source of the audio signal to be detected, but insensitive to surrounding background noise. The present invention virtually eliminates sources of background noise by detecting only the amplitude modulation of a light signal caused by water vapor or moisture that is modulated by the audio signal to be detected. The audio signal modulates the water vapor or moisture in a human being's breath.

A light emitter, configured to operate in a water-vapor absorption band, sends a light beam through a region containing this moisture and a corresponding light detector detects the received time-varying amplitude of a light signal that has escaped absorption by the water vapor or moisture. The light intensity or amplitude is time modulated by the variation in the moisture content caused by the voice of a person speaking (hereinafter referred to as a talker). Since background noise does not noticeably affect the moisture that is local to a talker's mouth, the present invention does not detect the background noise, thereby increasing signal quality of the received audio signal.

According to another aspect of the invention, unlike the prior art that teaches operating a laser at wavelengths outside of the water-vapor absorption ranges to avoid absorption of the light beam, the present invention configures its light emitters, such as lasers, to operate specifically within a water-vapor absorption range. Moreover, the present invention employs water vapor or moisture that is modulated by the talker's voice to modulate the light beam. In a conventional system that has a laser operating outside a water-vapor absorption band, a talker's voice does not affect the light beam. In other words, a talker's voice does not modulate the light beam to an extent that is detectable and from which audio information can be extracted.

According to another aspect of the invention, a light beam is directed near and in front of the talker's mouth so that the present invention is insensitive to background noise that degrades the performance of prior art microphones. Moreover, because the present invention is configured to detect acoustic waves that are near and extremely local to the talker's mouth, noise from other sources are not detected by the present invention.

Environmental conditions surrounding the talker, such as humidity or air conditioning, that do not affect prior art microphones can affect the signal quality of the audio signal detected by the present invention. Consequently, according to another aspect of the present invention, a second light emitter, second detector, and a differential amplifier are employed to measure the contribution of environmental conditions to the audio signal and to compensate the audio signal by subtracting the environmental contribution from the audio signal.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known devices and circuits are omitted so as to not obscure the description of the present invention with unnecessary detail.

Figure 1:
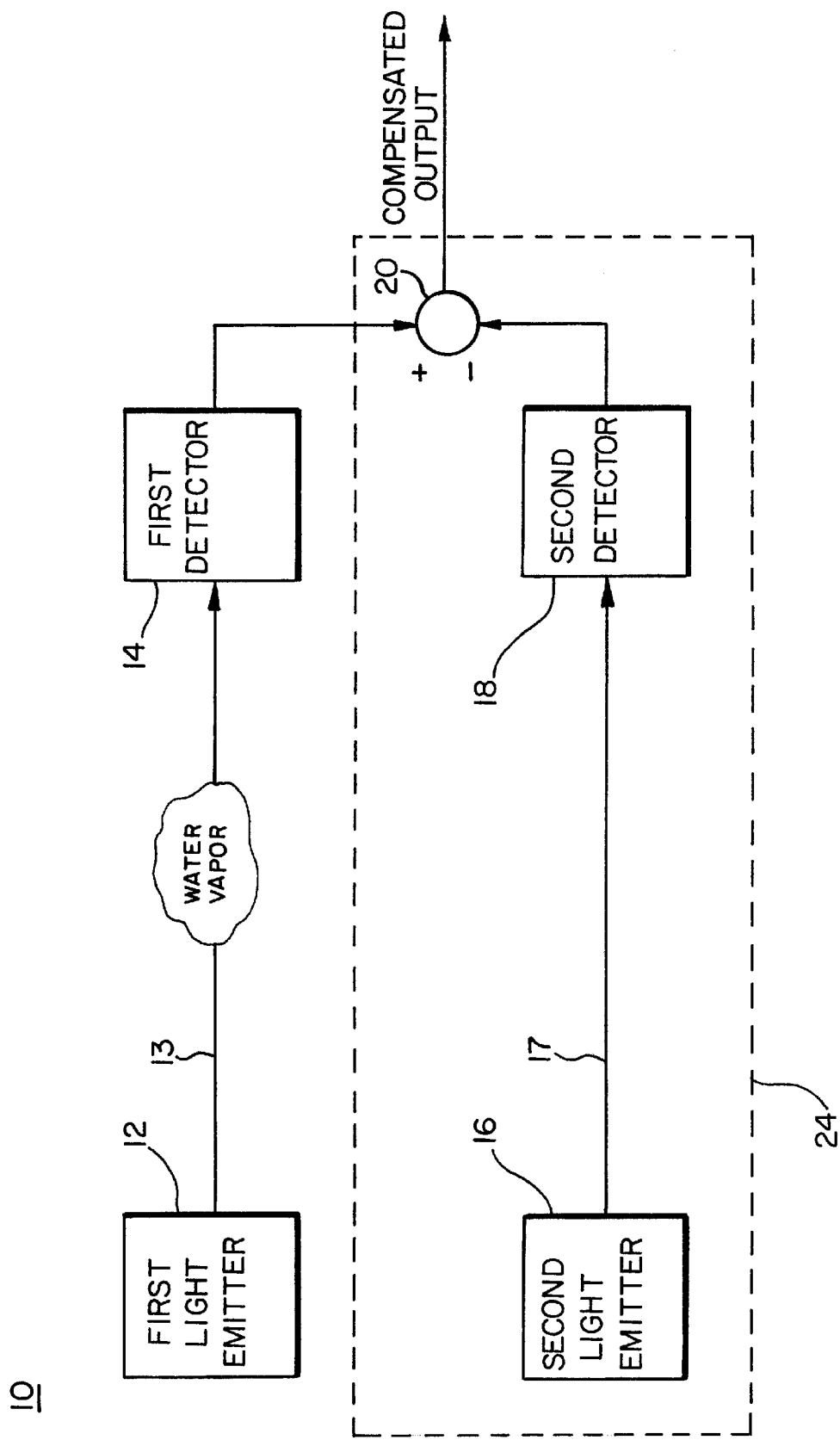
FIG. 1 is a simplified block diagram illustrating one embodiment of the audio sensing system of the present invention.

FIG. 1 is a simplified block diagram illustrating one embodiment of the audio sensing system 10 according to the present invention. The audio sensing system 10 includes a first light emitter 12, a first detector 14, a second light emitter 16, a second detector 18, and a differential amplifier 20, configured as shown in FIG. 1. The first light emitter 12 generates a first light beam 13 that is directed near and in front of a source of audio information, such as a talker's mouth, and detected by the first detector 14. The first light beam 13 is modulated by the talker's voice and also affected by environmental conditions near the talker. Specifically, the first beam 13 is modulated by the moisture content or water vapor in front of the talker's mouth that is modulated by the talker's voice.

The audio sensing system 10 optionally includes an environmental condition compensation unit 24, which is described in greater detail hereinbelow. The environmental condition compensation unit 24 includes the second light emitter 16, the second detector 18, and the differential amplifier 20. The second light emitter 16 generates a second light beam 17 that is directed near the talker but not directly in front of the talker's mouth, and is detected by the second detector 18.

In the prevent invention, lasers are used to emit the first and second light beams 13, 17, although those skilled in the art will appreciate that other light emitters may also be employed.

Unlike prior art lasers whose operating frequencies are specifically chosen to lie above or below a water-vapor absorption band to prevent the laser signal from being absorbed, the first and second light emitters 12, 16 of the present invention are configured to operate in a water-vapor absorption band so that the laser beam can be modulated by a time-varying moisture content (e.g., a talker's speech). For an excellent reference on the general principles of laser operation, please see, John A. Jamieson, Raymond H. Mcfee, Gilbert N. Plass, Robert H. Grube and Robert G. Richards, "Infrared Physics and Engineering," published by McGraw-Hill Book Company, Inc. (1963).

To specify a suitable operating frequency range for the light emitters 12, 16, so that the operating frequency is in a water-vapor absorption band, a transmittance versus wavelength curve can be consulted. For example, the transmittance versus wavelength curves (FIGS. 5–14(a) and 5–14(b)) on page 5–56 of "The Infrared Handbook", by William L. Wolfe and George J. Zissis, prepared by the Infrared Information and Analysis (IRIA) Center, Environmental Research Institute of Michigan (1978), can be employed to configure the light emitters 12, 16 according to the teachings of the present invention. A detailed absorption model is presented on pages 5–24 through 5–60. Since a first water-vapor absorption band begins at approximately 5 $\mu$m and ends at approximately 7 $\mu$m, and a second water-vapor absorption band begins at approximately 2.3 $\mu$m and ends at approximately 3 $\mu$m, the first and second light emitters 12, 16 can be implemented with a laser operating at a wavelength in either the first or second water-vapor absorption bands.

To select the types of lasers that can be employed to implement the first and second light emitters 12, 16 of the present invention, one can refer to a commercial laser table. For example, Richard C. Dorfs "The Electrical Engineering Handbook", published by CRC Press (1993), includes a table of important commercial lasers on page 739. A laser that is selected from such a table should be configured according to the teachings of the present invention before that laser is employed in the present system 10. A properly configured laser is a light source that generates a laser beam which is specially adapted to be modulated by a timevarying moisture content.

For example, the laser of the present invention can be implemented by tailoring a Color center laser (2.3–3.3 $\mu$m), a HF chemical laser (2.6–3.0 $\mu$m), or a Lead salt diode laser (3.3–2.9 $\mu$m) to the wavelength ranges noted above. Those skilled in the art can tune any of these lasers to a proper frequency that is suitable for a particular application. Consistent with the water-vapor absorption bands described previously, it is preferable to have the laser operate at approximately 2.67 $\mu$m and 6.55 $\mu$m because the transmittance of water vapor in these specified wavelength ranges is a pronounced minima within the first and second water-vapor absorption bands, as compared with the transmittance of light at other wavelengths.

The first and second detectors 14, 18 are conventional light receivers, whose operation and implementation are well known in the art. For example, such receivers are commonly implemented as silicon detectors driving high-impedance differential amplifiers. Moreover, the first and second detectors 14, 18 are configured to receive a signal in a frequency range corresponding to the operating frequency of the first and second light emitters 12, 16. For example, the silicon detectors can be doped to provide maximum sensitivity at the operating frequency.

Because human breath has relatively high concentrations of water vapor, the moisture content in front of a talker's mouth is high. The present invention capitalizes on the fact that the high moisture concentration strongly affects the opaqueness of the signal transmission path between the first light emitter 12 and the first detector 14. The acoustic energy of the talker modulates the instantaneous density of the water vapor. The water vapor then modulates the instantaneous opaqueness of the signal transmission path and the intensity of the signal received at the first detector 14. In other words, the first detector 14 detects the energy of the first beam 13 that has escaped absorption by the moisture.

Since the detectors or receivers 14, 18 are tuned to detect changes in the water vapor, other sounds (e.g., noise) that are not generated by a source of water vapor or moisture are not detected by the system 10 of the present invention. Accordingly, the signal to noise (S/N) ratio of the present invention is improved.

The audio sensing system 10 of the present invention can also include an environmental condition compensation unit 24. The environmental condition compensation unit 24 includes the second light emitter 16, the second detector 18, and the differential amplifier 20. The environmental condition compensation unit 24 measures the signal component caused by the environmental conditions and subtracts this signal component from the received audio information to generate a compensated output signal.

Specifically, the second light emitter 16 and the second detector 18 are employed to measure a signal component that is caused by the moisture or water vapor in the environment. These environmental factors or conditions can be caused by many different sources, and can include, by way of example, the humidity of the environment, the air conditioning in a room, or movement of the air in a room caused by a ventilation system or fan. These environmental conditions can affect and distort the audio information produced by the first detector 14. Since the second light beam 17 is used to measure the environmental conditions immediately surrounding the talker, the second beam 17 is preferably directed at a location near the talker but where the talker's voice cannot modulate or otherwise affect its output. As a non-limiting example, the second light beam 17 can be directed behind the talker's head or in front of the talker's torso below the talker's chest.

A differential amplifier 20 is coupled to the first and second detectors 14, 18 to provide an automatic correction for ambient transmissibility. The differential amplifier 20 employs the output of the second detector 18 to compensate for the effects of the environmental conditions on the audio information received from the first detector 14. This compensation is performed by subtracting the signal components caused by the environmental conditions from the audio information.

Moreover, the differential amplifier 20 includes a first input and a second input for receiving first and second input signals from the first and second detectors 14, 18, respectively. The differential amplifier 20, responsive to the first and second input signals, generates a compensated output signal representing the difference between the first and second input signals. The compensated output signal represents the acoustic energy of the speaker's voice without signal components caused by the environmental conditions. The compensated output signal can then be transmitted by any suitable means (e.g., cable, RF link, IR etc.) for amplification, distribution, and/or recording.

The differential amplifier 20 can be coupled to an analog to digital (A/D) converter (not shown) that converts the analog audio signal into a corresponding digital audio signal. Thereafter, the digital audio signal can be provided to a computer processor and related software or other dedicated audio hardware (also not shown) for further signal processing.

A system configured without the environmental condition compensation unit 24 would still be operative and produce audio output. However, as explained above, the signal quality of the audio signal decreases because the signal is not compensated for the ambient environmental conditions (e.g., moisture) near the talker but not directly attributed to the talker's speech.

For better signal quality, it is desirable that the first light beam 13, generated by the first light emitter 12, passes close to the talker (as a non-limiting example, within 2 to 4 inches of the talker). The second light beam 17 generated by the second light emitter 16 preferably passes near (as a non-limiting example, within 6 to 12 inches of the talker's body), but not in front of, the talker's mouth.

Figure 2:
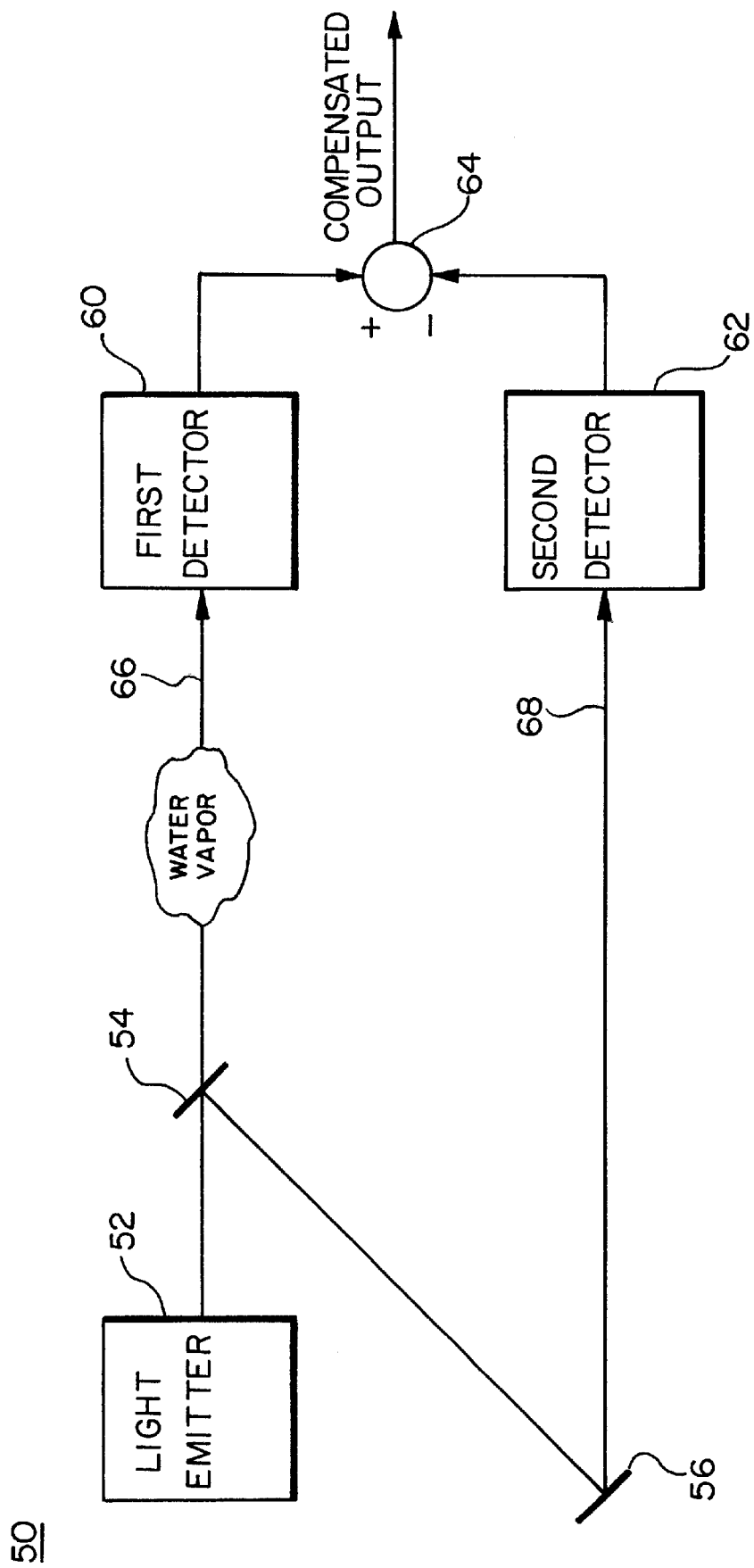
FIG. 2 is a simplified block diagram illustrating an alternative embodiment of the audio sensing system of the present invention.

FIG. 2 is a simplified block diagram illustrating an alternative embodiment of the audio sensing system 50 of the present invention. In this system 50, one light emitter 52, a beam splitter 54, a reflector (e.g. a mirror) 56, a first detector 60, a second detector 62, and a differential amplifier 64 are employed. The light emitter 52 generates one beam that is split into two beams (i.e., a first 66 and second 68 beam) by the beam splitter 54. The first beam 66 is directed near and in front of the talker's mouth, and the second beam 68 is directed near the talker by using the reflector 56, but not near or in front of the mouth of the talker.

The first beam 66 is modulated by the moisture from the talker's mouth, as well as by the ambient environmental conditions. The second beam 68 is modulated only by the ambient environmental conditions. The first detector 60, second detector 62, and the differential amplifier 64 perform the same functions and operate in the same manner as described previously for the first embodiment, to provide a compensated output signal.

The audio sensing system 10 of the present invention can be used in many different ways and in many different situations. All the light emitters 12, 16 and detectors 14, 18 can be worn on the talker, or all of the light emitters 12, 16 and detectors 14, 18 can be remote from the talker. Alternatively, one or more of the light emitters 12, 16 and detectors 14, 18 can be worn on the talker while the remaining light emitters 12, 16 and detectors 14, 18 can be remote from the talker. As illustrated above, reflectors can be employed to direct the light beams to the detectors.

Figure 4:
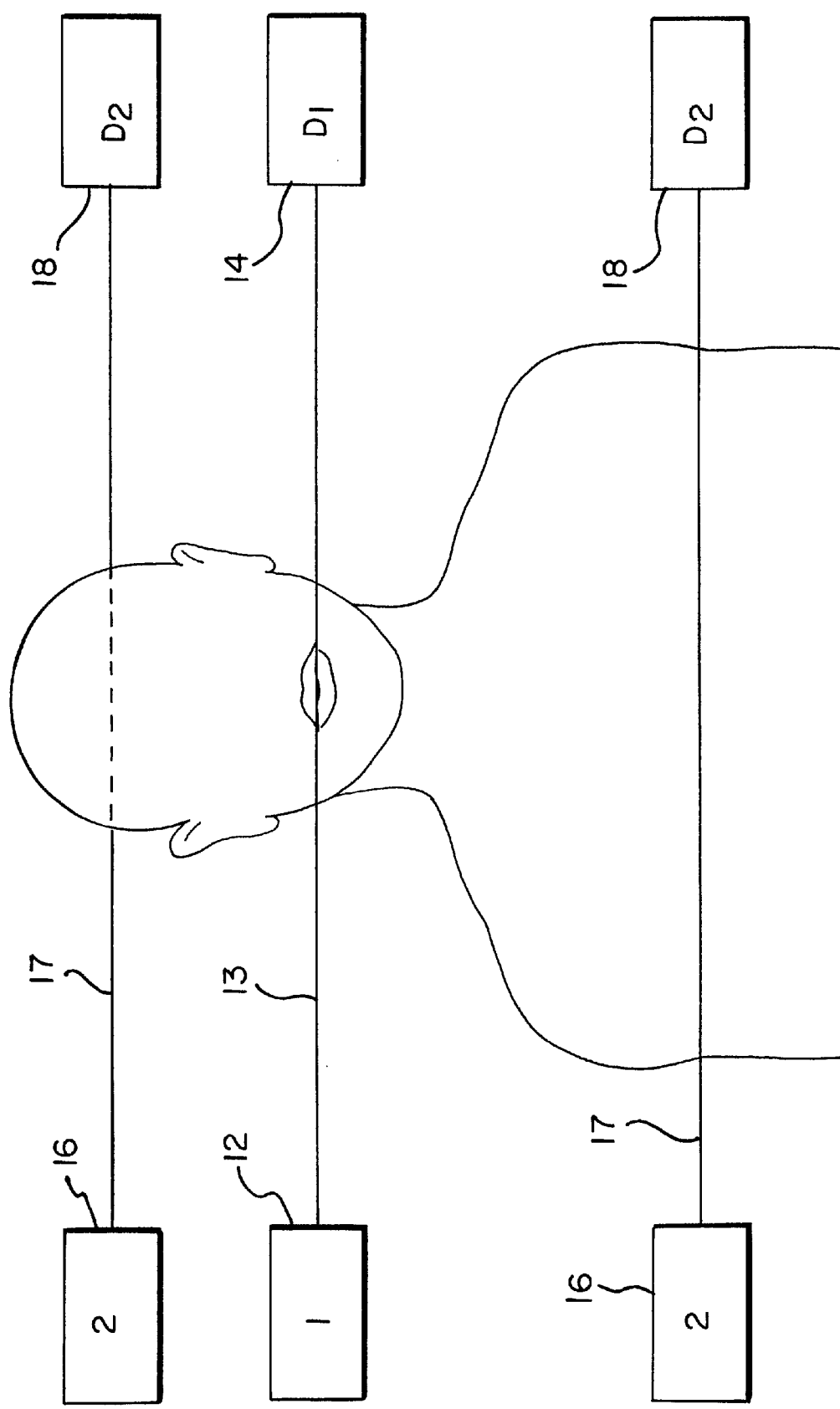
FIG. 4 illustrates the placement of first and second light emitters and detectors in accordance with one embodiment of the present invention.

FIG. 4 illustrates a non-limiting example, in which the first light emitter 12 can be disposed in a wall on one side of a room and configured to send a beam 13 in a horizontal path from one side of the talker, in front of the talker's mouth, to the other side of the talker and to the detector 14, disposed in a wall on the other side of the room. Similarly, the second light emitter 16 can be disposed in a wall on one side of a room and configured to send a light beam 17 in a horizontal path from one side of the talker, to a region near the talker, to the other side of the talker and to the second detector 18, disposed in a wall on the other side of the room. To accommodate movement by the talker around a particular area, such as a stage, the first light emitter 12 can be aimed at the talker and can be adapted to follow the movement of the talker, with a plurality of detectors 14 provided at the opposite wall adapted so that one of these detectors 14 will detect a modulated beam 13 at any time.

Alternatively, the first light emitter 12 can be disposed on the talker and configured to send a light beam 13 in a vertical path from below the talker's mouth, in front of the talker's mouth to a detector 14 disposed above the talker's mouth. One detector 14 or a plurality of detectors 14 can be disposed in the ceiling, for example, to accommodate a talker who is moving around within a particular area.

Figure 5:
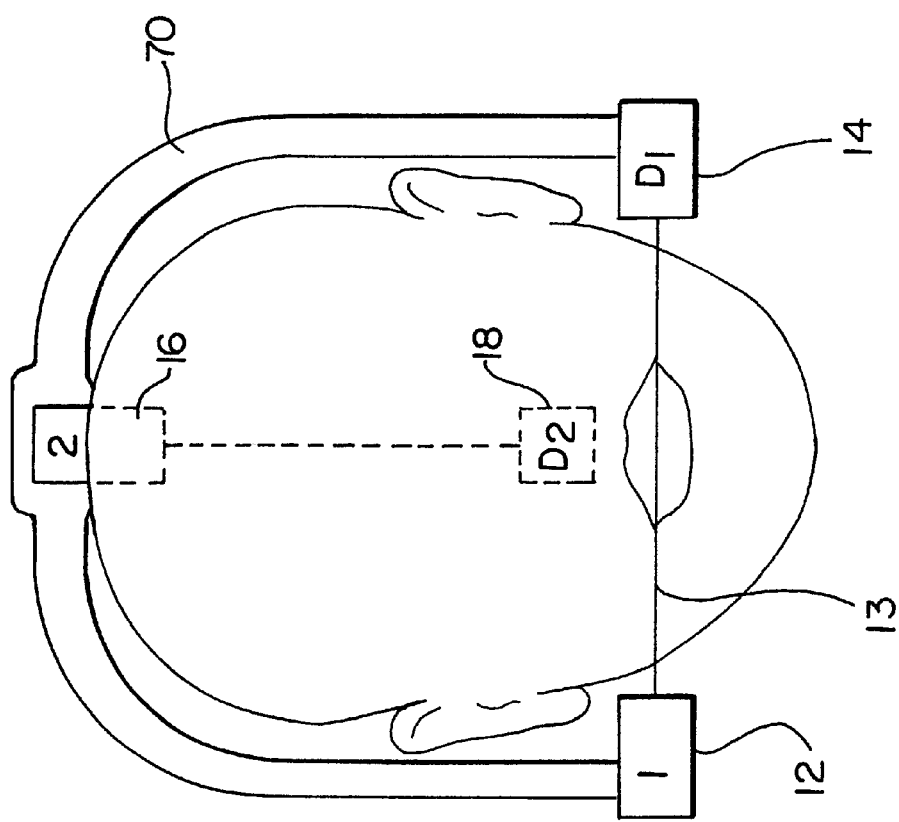
FIG. 5 illustrates the audio sensing system of the present invention as embodied in a headset.

In another example illustrated in FIG. 5, the first light emitter 12, the first detector 14, a second light emitter 16, and a second detector 18 can all be packaged into a headset 70 that is removably coupled to the talker's head. The first light emitter 12 and the first detector 14 are disposed on opposite sides of the headset 70 at a position approximately below the talker's ears, so that the first light emitter 12 can emit a first beam 13 across the talker's mouth. The second light emitter 16 and the second detector 18 are preferably disposed on the headset 70 at positions where the second beam 17 from the second light emitter 16 will not be affected by the moisture from the talker's speech. For example, the second light emitter 16 and the second detector 18 may be disposed on the rear outer surface of the headset 70, as shown in phantom in FIG. 5.

Thus, the audio sensing system 10 of the present invention is easy to use and offers the user a wide range of options in its application and use. The system 10 can be worn by the talker, or set up to operate in a manner that is remote from the talker. The system 10 can be arranged to operate while the talker is stationary, or while the talker is moving around.

Figure 3:
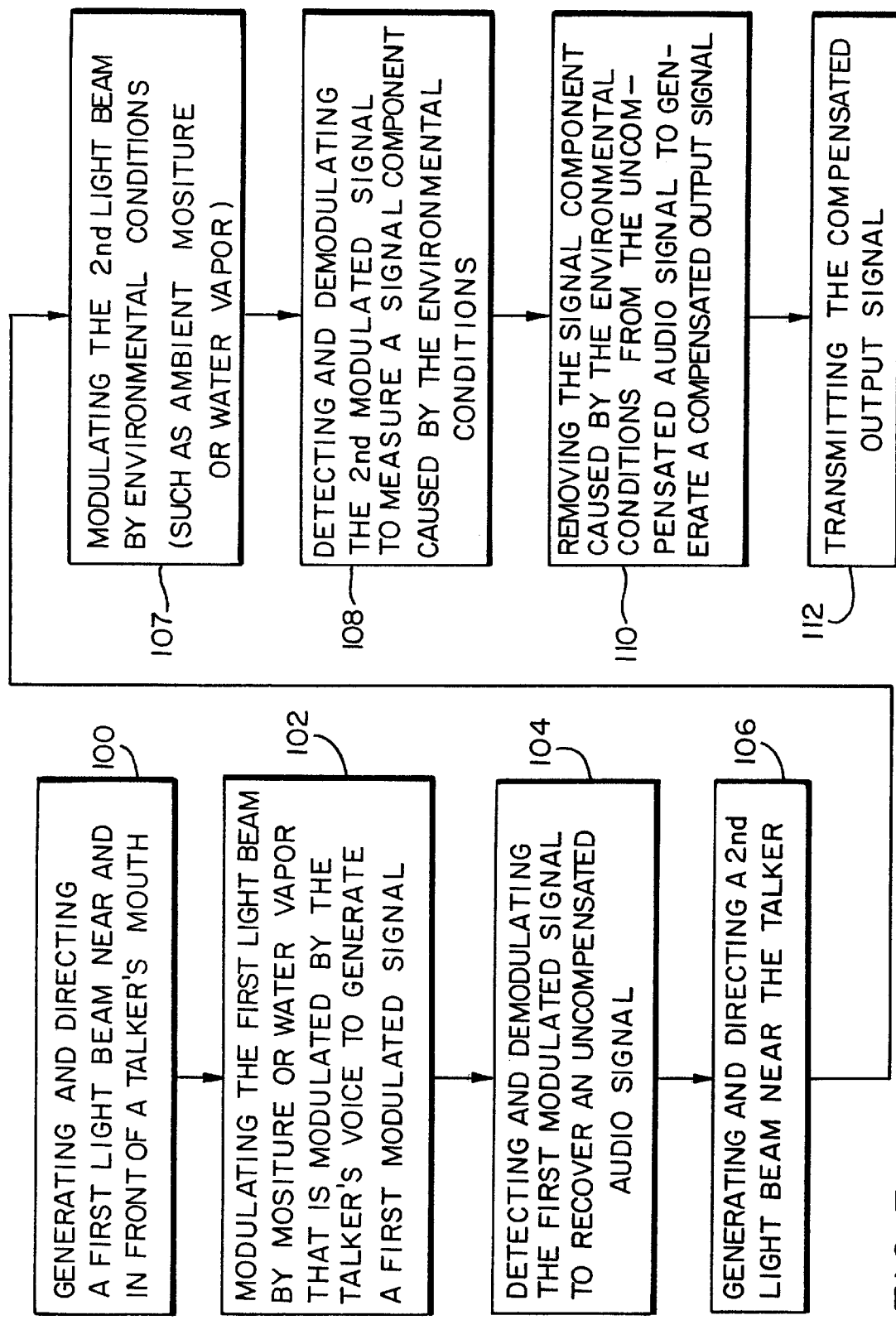
FIG. 3 is a flowchart of a method for detecting audio signals in accordance to one embodiment of the present invention.

FIG. 3 is a flowchart of a method for detecting audio signals in accordance to a preferred embodiment of the present invention. In step 100, a first light beam is generated and directed near and in front of a talker's mouth. In step 102, the talker generates acoustic waves that modulate the moisture in front of the talker's mouth. The moisture content in front of the talker's mouth and the environmental conditions near the talker modulate the light beam to generate a first modulated signal. In step 104, the first modulated light beam is detected and demodulated to recover an uncompensated audio signal.

In step 106, a second light beam is generated and directed near the talker but not in front of the talker's mouth. In step 107, the second light beam is modulated only by the surrounding environmental conditions to generate a second modulated signal. In step 108, the second modulated signal is detected and demodulated to measure the signal component caused by the surrounding environmental conditions. In step 110, the signal component caused by the environment is removed (e.g., subtracted) from the uncompensated audio signal to generate the compensated output signal. As amplitude detection by silicon cells can generate signal envelopes, the difference of the first and second modulated signals effectively eliminates extraneous environmentally caused signal components by common-mode rejection.

In step 112, the compensated output signal is transmitted for amplification, distribution, and/or recording. It should be noted that the specific order of the steps can be altered to suit a particular application. For example, the second light beam can be generated, modulated and detected before the first light beam is generated, modulated and detected. Moreover, not all steps are needed to generate a usable audio output. For example, steps 106 through 110 can be omitted at the cost of signal quality.

The system 10 of the present invention does not detect sounds from sources that do not produce moisture. For example, sounds generated by musical instruments (e.g., piano, guitar, violin) are not detected.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A system including an apparatus for detecting an audio signal generated by an audio source, said apparatus comprising:

a first light source having a predetermined operating frequency range in a water-vapor band generating a first carrier signal having a frequency in the operating range and directing said first carrier signal adjacent to the audio source which modulates the density of moisture at the audio source; wherein the modulated moisture density modulates said first carrier signal with audio information; and a first light detector for detecting and demodulating said first modulated carrier signal to recover the audio information.

2. The system of claim 1, wherein said predetermined frequency range begins at approximately 5 $\mu$m and ends at approximately 7 $\mu$m.

3. The system of claim 2, wherein said predetermined frequency range is the peak water-vapor absorption band near 6.7 $\mu$m.

4. The system of claim 1, wherein said predetermined frequency range begins at approximately 2.3 $\mu$m and ends at approximately 3 $\mu$m.

5. The system of claim 4, wherein said predetermined frequency range is the peak water-vapor absorption band near 2.7 $\mu$m.

6. The system of claim 1, wherein said audio source employs moisture to modulate said carrier signal.

7. The system of claim 1, wherein said apparatus is remote from said audio source.

8. The system of claim 1, wherein said apparatus is disposed adjacent said audio source.

9. The system of claim 1, wherein said audio source is a human talking.

10. The system of claim 9, wherein said apparatus is a headset worn on the human head.

11. A method of remotely detecting audio signals generated by an audio source, comprising the steps of:

(a) directing a first signal adjacent to an audio source containing moisture and allowing the moisture modulated by said audio source to modulate said first signal with audio information;

(b) detecting said modulated first signal; and (c) demodulating said modulated first signal to recover the audio information.

12. The method of claim 11, further comprising the steps of:

(d) determining a signal component caused by environmental conditions near said audio source, and (e) removing the signal component caused by the environmental conditions near said audio source from the recovered audio signal.

13. The method of claim 12, wherein step (d) further comprises the steps of:

(d1) directing a second signal near said audio source and allowing environmental conditions near said audio source to modulate said second signal into a modulated second signal;

(d2) detecting said modulated second signal; and (d3) demodulating said modulated second signal to recover the signal component caused by environmental conditions near said audio source.

* * * * *